G. A. SLEIGHT.
URINAL TRAP GUARD AND DISINFECTING DEVICE.
APPLICATION FILED MAY 26, 1921.
1,430,598.
Patented Oct. 3, 1922.
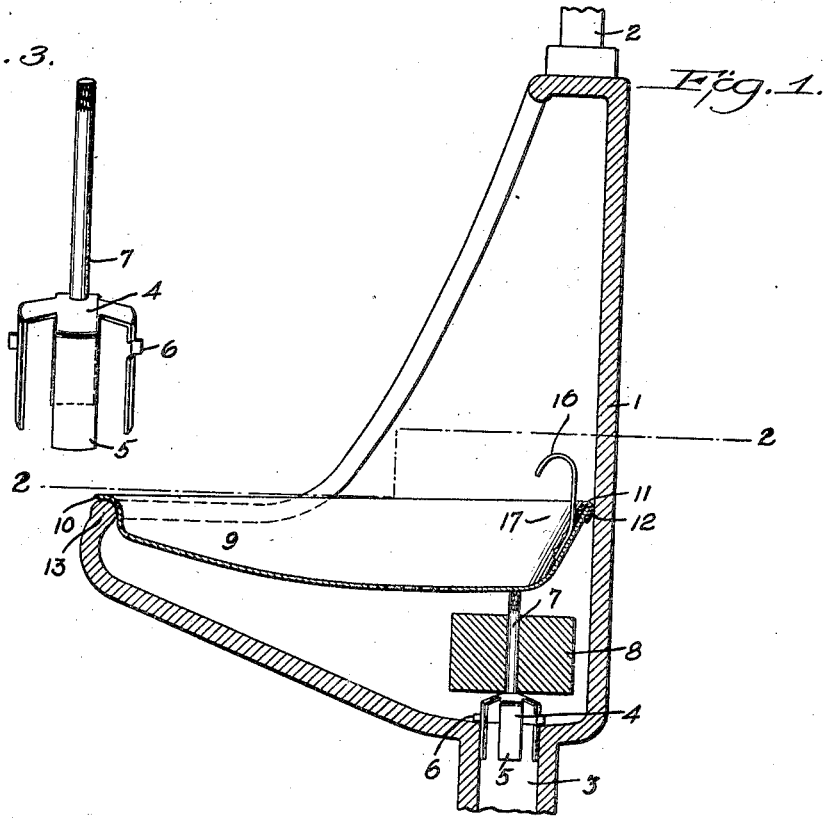
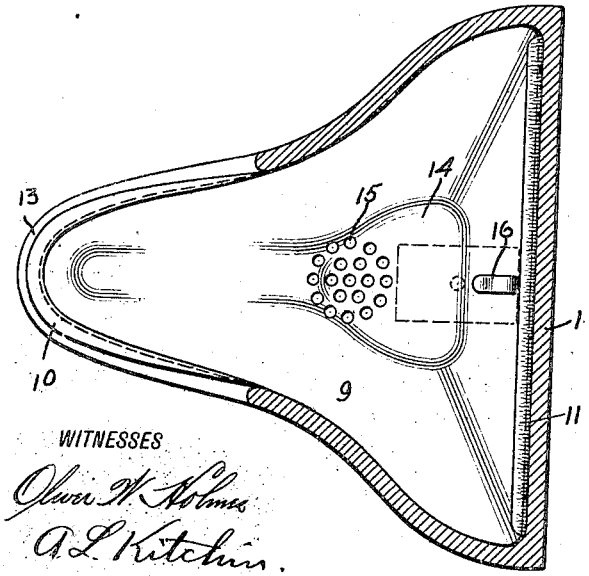
WITNESSES
INVENTOR
G. A. SLEIGHT
BY
ATTORNEYS Patented Oct. 3, 1922.

1,430,598

UNITED STATES PATENT OFFICE.

GEORGE A. SLEIGHT, OF HYDE PARK, NEW YORK.

URINAL TRAP GUARD AND DISINFECTING DEVICE.

Application filed May 26, 1921. Serial No. 472,827.

*To all whom it may concern:*

Be it known that I, GEORGE A. SLEIGHT, a citizen of the United States, and a resident of Hyde Park, in the county of Dutchess and State of New York, have invented a new and Improved Urinal Trap Guard and Disinfecting Device, of which the following is a full, clear, and exact description.

This invention relates to urinals and particularly to an improved guard and disinfecting device therefor and has for an object to provide a construction wherein a proper amount and a proper quality of disinfectant may be placed and used as needed without wasting.

Another object in view is to provide an improved arrangement of pan for preventing the liquid from washing undesirably the disinfectant used in connection therewith.

In the accompanying drawing—

Figure 1 is a longitudinal vertical section through a device embodying the invention.

Figure 2 is a sectional view through Figure 1 approximately on line 2—2.

Figure 3 is a perspective view on an enlarged scale of a disinfectant carrying member.

Referring to the accompanying drawing by numerals, 1 indicates a urinal of substantially the usual construction provided with a water inlet pipe 2 for flushing purposes and a suitable discharge outlet 3, which outlet is preferably comparatively large so that there will be a ready out-flow of the flushing liquid though this is not absolutely essential to the invention as an appropriate outlet would operate. Arranged in the outlet 3 is a disinfectant support 4 having a plurality of legs 5 which may loosely fit into the outlet 3 or may loosely press the walls thereof, certain of said legs being provided with pressed out lugs 6 resting on the bottom of the urinal whereby member 4 cannot accidentally move down into the outlet 3. A shaft or pin 7 extends upwardly from the legs 5 and acts as a retaining pin for a solid lump 8 of disinfectant which may be of any special or preferred kind.

It will be noted from Figure 1 that the disinfectant 8 is a short distance above the bottom of the urinal and consequently will not stand in any liquid unless the level reaches an appreciable height which is the case whenever the device is flushed. In this way an ample supply of disinfectant is removed from lump 8 to kill all odor while at the same time the lump 8 is not unnecessarily used. In order that the disinfectant and its support may function as described, a trash pan or guard 9 is provided and conforms substantially to the shape of the bowl near the section line 2—2. The pan near the front is preferably provided with a flange 10 which overlaps part of the front of the urinal while the rear part of the pan is provided with a flange 11 carrying a buffer 12 of rubber or other desired material. The length of the pan is such that it must be forced downwardly into the position shown in Figure 1 and is pinched between the rear wall of the urinal and the front wall 13. This pinching action is ample to hold the same in the position shown in Figure 1 whereby it will catch any cigar or cigarette butts or other trash which may be thrown into the urinal. The pan 9 preferably tapers downwardly towards a central point but at the center is provided with a flat section 14 which is perforated at 15, said perforated section being near the front of the flat portion whereby when flushing or whenever liquid is discharged into the pan the foreign matter may be floated off or washed away from the openings 15 permitting the liquid to freely pass into the bottom of the urinal and from thence out the discharge opening 3. Whenever it is desired to clean the guard or pan 9 the hook-shaped handle 16 is grasped and the pan is pulled upwardly in a swinging motion. After the pan has been removed it may be cleaned in any desired manner and if desired a new block or lump 8 of disinfectant provided. In case there should be only a small lump of disinfectant, the same could be removed and thrown into the bottom of the urinal beneath the pan 9 while a new block or lump can be arranged on pin 7. By the construction and arrangement of the pan described the urinal may be used in the usual manner and may be flushed from time to time as desired while the disinfectant 8 will continue to function in a proper manner without an undue loss thereof.

What I claim is:—

1. In a device of the character described, the combination with a urinal bowl, a protecting guard, a removable disinfectant support positioned in the outlet of the bowl, said support being formed with a pin for receiving and supporting a block of disinfectant.

2. In a device of the character described, the combination with a urinal bowl of a disinfectant support therefor provided with a plurality of legs fitting into the outlet of the bowl, and a retaining pin projecting from said legs, said pin being adapted to receive and support a block of disinfectant above the bottom of the bowl.

3. In a device of the character described, the combination with a urinal bowl of a disinfectant support therefor comprising a plurality of guiding legs, certain of said legs having projecting lugs fitting against the bottom of the bowl, and a pin extending upwardly from said legs, said lugs supporting the top of the legs above the bottom of the bowl whereby disinfectant carried by said pin resting on said legs will be maintained continually above the bottom of the bowl.

GEORGE A. SLEIGHT.